United States Patent
Kim et al.

(10) Patent No.: US 6,999,056 B1
(45) Date of Patent: Feb. 14, 2006

(54) LIQUID CRYSTAL MONITOR DRIVE APPARATUS CAPABLE OF REDUCING ELECTROMAGNETIC INTERFERENCE

(75) Inventors: Jun Hee Kim, Seoul (KR); Hee Gyung Yoon, Uiwang-shi (KR); Han Sang Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/522,449

(22) Filed: Mar. 9, 2000

(30) Foreign Application Priority Data

Apr. 6, 1999 (KR) ................ P1999-11839

(51) Int. Cl.
*G09G 3/36* (2006.01)
(52) U.S. Cl. ........................................ 345/99
(58) Field of Classification Search ........... 345/87, 345/98, 99, 100, 88, 660, 667.01, 204, 206, 345/205, 212, 102, 211; 700/79, 296; 713/323
See application file for complete search history.

(56) References Cited

U.S. PATENT DOCUMENTS

| | | | |
|---|---|---|---|
| 4,383,273 A | | 5/1983 | Lunn |
| 4,758,896 A | | 7/1988 | Ito |
| 5,422,807 A | * | 6/1995 | Mitra et al. .............. 700/79 |
| 5,532,935 A | * | 7/1996 | Ninomiya et al. .......... 700/296 |
| 5,739,877 A | | 4/1998 | Onisawa et al. |
| 5,786,801 A | * | 7/1998 | Ichise ..................... 345/102 |
| 5,874,937 A | * | 2/1999 | Kesatoshi ................ 345/428 |
| 5,909,205 A | * | 6/1999 | Furuhashi et al. .......... 345/98 |
| 6,115,032 A | * | 9/2000 | Kotha et al. ............. 345/211 |
| 6,535,985 B1 | * | 3/2003 | Oshima et al. ........... 713/323 |

FOREIGN PATENT DOCUMENTS

| | | |
|---|---|---|
| JP | 9-146109 A | 6/1997 |
| JP | 10114175 | 5/1998 |
| JP | 10-161604 A | 6/1998 |

* cited by examiner

*Primary Examiner*—Chanh Nguyen
(74) *Attorney, Agent, or Firm*—Birch, Stewart, Kolasch & Birch, LLP

(57) ABSTRACT

A liquid crystal monitor drive apparatus that is less vulnerable to EMI emissions and minimizes the manufacturing cost thereof includes a connector for inputting an analog graphic signal from a graphic card through a transmission cable, an analog-digital converter for converting the analog graphic signal from the connector into a digital graphic data, a scaler for scaling the definition of the digital graphic data from the analog-digital converter according to a liquid crystal panel, and a timing controller for driving the liquid crystal panel based on the digital graphic data from the scaler. At least two of the analog-digital converter, the scaler, and the timing controller are arranged in a unitary integrated circuit chip.

4 Claims, 10 Drawing Sheets

LIQUID CRYSTAL MONITOR DRIVE APPARATUS CAPABLE OF REDUCING ELECTROMAGNETIC INTERFERENCE

BACKGROUND OF THE INVENTION

1. Field of the Invention

This invention relates to a liquid crystal monitor having a liquid crystal panel, and more particularly, to a liquid crystal monitor drive apparatus capable of reducing electromagnetic interference (hereinafter, EMI).

2. Description of the Related Art

Conventionally, a liquid crystal panel allows a picture corresponding to image signals to be displayed by controlling a light quantity passing through the panel. The liquid crystal panel provides a highly enhanced picture quality because of improvements in liquid crystal material and recent developments in the fine picture element (or pixel) treatment technique. Also, a typical liquid crystal panel is light weight, very thin, and has low power consumption requirements. Liquid crystal panels can be used for notebook computers or monitors for office automation systems. A monitor using a liquid crystal panel, hereinafter liquid crystal monitor, is driven by a drive apparatus of an analog signal system or a digital signal system, depending on whether the video signal or graphic signal is either analog or digital.

A liquid crystal monitor drive apparatus of the analog system, such as the one shown in FIG. 1, includes a signal converting stage 12 and a panel control stage 14 located between a graphic card 10 and a liquid crystal panel (not shown). The graphic card 10 is connected with the signal converting stage 12 via a first cable 16, and the signal converting stage 12 is connected to the panel control stage 14 through a second cable 18. The first and second cables 16 and 18 can be any one of serial and parallel interface types. Also, first and second cables 16 and 18 are shielded to suppress the EMI caused by radio frequency signals. The shielding of the first and second cables 16 and 18 increases the costs of the liquid crystal monitor drive apparatus.

The graphic card 10 is installed into a computer body. The graphic card 10 generates an analog graphic signal or video signal (hereinafter, analog graphic signal) to be applied to the signal converting stage 12 through the first cable 16. The graphic card 10 also supplies horizontal and vertical synchronous signals to the signal converting stage 12 through the first cable 16.

The signal converting stage 12 consists of a first connector 20, an ADC (Analog to Digital Converter) 22, a scaler 24, an LVDS (Low Voltage Differential Signaling) sender 26 and a second connector 28 connected between the first cable 16 and the second cable 18. The first connector 20 transmits the analog graphic signal from the first cable 16 to the ADC 22 as well as the horizontal and vertical synchronous signals. The ADC 22 converts the analog graphic signal into graphic data having a digital signal waveform shape. The graphic data generated at the ADC 22 includes R (red), G (Green) and B (Blue) data. The graphic data can also have 24 or 48 data bits according to a type of data bus and the ADC 22 applies the graphic data to the scaler 24 through a 24-bit or 48-bit bus. The scaler 24 varies the graphic data to match the definition and timing of the liquid crystal panel. For example, if the definition of the graphic data is higher than that of the liquid crystal panel, the scaler 24 scales down the graphic data and allows the picture corresponding to the scaled down digital graphic signal to be displayed on the liquid crystal panel. On the other hand, the scaler 24 scales up the digital graphic signal when the definition of the digital graphic signal is lower than that of the liquid crystal panel. The picture corresponding to the scaled up graphic data is then displayed on the entire or central area of the liquid crystal panel. In order to adjust the timing of the graphic data, the scaler 24 receives the horizontal and vertical synchronous signals. Also, the scaler 24 transmits the scaled graphic data to the LVDS sender 26 together with the clock signal and the horizontal and vertical synchronous signals. The LVDS sender 26 converts the parallel graphic data into serial graphic data and encodes the serial graphic data into a low voltage differential signal. The low voltage differential signal is then transmitted to the second cable 18 through the second connector 28. The LVDS sender 26 can be replaced with a panel link sender. Furthermore, the LVDS sender 26 may be replaced by a TTL (Transistor Transistor Logic) bus 26A. The TTL bus 26A transmits the original parallel graphic data from the scaler 24 to the second cable 18 through the second connector 28. Also cable 18 can be removed if the connector 28 is directly connected to the other connector 32. The signal converting stage 12 can further include a frame memory 30 connected with the scaler 24 in order to vary the frame rate of the graphic data.

Furthermore, the panel control stage 14 is composed of a third connector 32, a LVDS receiver 34 and a timing controller 36 connected serially between the second cable 18 and the liquid crystal panel. The LVDS receiver 34 inputs the low voltage differential signal, the clock signal and the horizontal and vertical synchronous signals from the second cable 18 through the third connector 32. The LVDS receiver 34 decodes the low voltage differential signal and obtains the serial graphic data. The LVDS receiver 34 also converts the serial graphic data into the parallel graphic data. The parallel graphic data generated at the LVDS receiver 34 is input into the timing controller 36 along with the clock signal and the horizontal and vertical synchronous signals. The LVDS receiver 34 can be replaced with a panel link receiver. Furthermore, the LVDS receiver 34 can be replaced by a TTL bus 34A. The TTL bus 34A transmits the original parallel graphic data from the third connector 32 to the timing controller 36. The timing controller 36 drives gate and source drive ICs (Integrated Circuits) on the liquid crystal panel and a common voltage Vcom to be applied to the liquid crystal panel, based on the graphic data, the clock signal, and the horizontal and vertical synchronous signals.

FIG. 2 illustrates a liquid crystal monitor drive apparatus of a digital system having a signal converting stage 42 and a panel control stage 44 located between a graphic card 40 and a liquid crystal panel (not shown). The graphic card 40 is connected with the signal converting stage 42 via a first cable 46, and the signal converting stage 42 is connected to the control stage 44 through a second cable 48. The first cable 46 may vary in accordance with digital interface standards (e.g., P&G, DFP, DVI and so on). The first and second cables 46 and 48 may be any one of serial and parallel interface types based on the liquid crystal panel. Also, the first and second cables 46 and 48 are shielded to suppress the EMI caused by radio frequency signals, thereby increasing the costs of the liquid crystal monitor drive apparatus. The graphic card 40, which is installed into a computer body, generates parallel graphic data and encodes the parallel graphic data including R, G, and B data into a transmittance-minimized differential signal. To this end, the graphic card 40 includes a TMDS (Transmittance-Minimized Differential Signaling) sender. The transmittance-minimized differential signal is applied to the signal converting stage 42 through the first cable 46. In addition, the graphic card 40 supplies a clock signal and horizontal and vertical synchronous signals to the signal converting stage 42 through the first cable 46.

The signal converting stage 42 consists of a first connector 50, a TMDS receiver 52, a scaler 54, a LVDS sender 56 and a second connector 58 connected between the first and second cables 46 and 48. The first connector 50 transmits the transmittance-minimized differential signal from the first cable 46 to the TMDS receiver 52 as well as the clock signal and the horizontal and vertical synchronous signals. The first connector 50 can be differed according to graphic data transmission standards. The TMDS receiver 52 inputs the transmittance-minimized differential signal, the clock signal and the horizontal and vertical synchronous signals from the first cable 46 through the first connector 50. The TMDS receiver 52 decodes the transmittance-minimized differential signal and obtains the parallel graphic data. The parallel graphic data generated at the TMDS receiver 52 is applied to the scaler 54. The graphic data decoded by the TMDS receiver 52 can have 24 or 48 data bits according to a type of data bus and the TMDS receiver 52 applies the graphic data to the scaler 54 through a 24-bit or 48-bit bus. The scaler 54 varies the definition and timing of the graphic data from the TMDS receiver 52 to match the definition and timing of the liquid crystal panel. For example, if the definition of the graphic data is higher than that of the liquid crystal panel, the scaler 54 scales down the graphic data and allows the picture corresponding to the scaled down digital graphic signal to be displayed on the liquid crystal panel. On the other hand, the scaler 54 scales up the digital graphic signal when the definition of the digital graphic signal is lower than that of the liquid crystal panel. Then, the picture corresponding to the scaled up graphic data is displayed on the entire or central area of the liquid crystal panel. In order to adjust the timing of the graphic data, the scaler 54 receives the clock signal and the horizontal and vertical synchronous signals. Also, the scaler 54 transmits the scaled graphic data to the LVDS sender 56 together with the clock signal and the horizontal and vertical synchronous signals. The LVDS sender 56 arranges the parallel graphic data into serial graphic data and encodes again the serial graphic data into a low voltage differential signal. The low voltage differential signal is transmitted to the second cable 48 through the second connector 58. Such a LVDS sender 56 can be replaced with a panel link sender. Furthermore, the LVDS sender 56 can be replaced by a TTL (Transistor Transistor Logic) bus 56A. The TTL bus 56A transmits the original parallel graphic data from the scaler 54 to the second cable 48 through the second connector 58. Also, the signal converting stage 42 can include a frame memory 60 connected with the scaler 54 in order to vary the frame rate of the graphic data.

The panel control stage 44 is composed of a third connector 62, an LVDS receiver 64 and a timing controller 66 connected serially between the second cable 48 and the liquid crystal panel. The LVDS receiver 64 inputs the low voltage differential signal, the clock signal and the horizontal and vertical synchronous signals from the second cable 48 through the third connector 62. The LVDS receiver 64 decodes the low voltage differential signal and obtains the serial graphic data. Also, the LVDS receiver 64 arranges the serial graphic data into the parallel graphic data. The parallel graphic data generated at the LVDS receiver 64 is applied to the timing controller 66 with the clock signal and the horizontal and vertical synchronous signals. The LVDS receiver 64 can be replaced with a panel link receiver.

Furthermore, the LVDS receiver 64 can be replaced by a TTL bus 64A. The TTL bus 64A transmits the original parallel graphic data from the third connector 62 to the timing controller 66. The timing controller 66 drives gate and source drive ICs on the liquid crystal panel and a common voltage Vcom to be applied to the liquid crystal panel based on the graphic data, the clock signal and the horizontal and vertical synchronous signals.

As described above, the liquid crystal monitor drive apparatuses of FIGS. 1 and 2 reduce the EMI by using the LVDS sender and receiver as well as the shielding cables. However, in the liquid crystal monitor drive apparatuses of FIGS. 1 and 2, the graphic signal or data generated at the graphic card 10 or 40 must pass through a plurality of circuits to arrive at the liquid crystal panel. As a result, a great amount of wiring for radio frequency signals must be formed on a printed circuit board and in general, cables and connectors are major factors causing EMI for the liquid crystal monitor drive apparatus. Consequently, the liquid crystal monitor drive apparatus is affected by the EMI. The EMI in the liquid crystal monitor drive apparatus becomes more significant as the liquid crystal panel displays graphic data at a higher definition. For example, in the liquid crystal monitor having an SXGA class of the liquid crystal panel, the clock signal has a high frequency of 108 MHz where the frequency of the vertical synchronous signal is 60 Hz. On the other hand, if the frequency of the vertical synchronous signal is 75 Hz, the clock signal has a high frequency of 133 MHz. As a result, in the liquid crystal monitor drive apparatus for driving the SXGA class of the liquid crystal panel, the EMI becomes greater. Furthermore, if the liquid crystal monitor drive apparatus uses the LVDS sender and receiver and the shielded cables in order to suppress the EMI, the cost of the liquid crystal monitor drive apparatus increases significantly.

SUMMARY OF THE INVENTION

To overcome the problems described above, preferred embodiments of present invention provide a liquid crystal monitor drive apparatus that is much less vulnerable to EMI while minimizing the manufacturing cost.

A liquid crystal monitor drive apparatus according to a preferred embodiment of the present invention preferably includes a connector for inputting an analog graphic signal from a graphic card through a transmission cable, an analog-digital converter for converting the analog graphic signal from the connector into digital graphic data, a scaler for scaling the definition of the digital graphic data from the analog-digital converter according to a liquid crystal panel, and a timing controller for driving the liquid crystal panel based on the digital graphic data from the scaler, wherein at least two of the analog-digital converter, the scaler and the timing controller are integrated in an integrated circuit chip.

A liquid crystal monitor drive apparatus according to another preferred embodiment of the present invention preferably includes a connector for inputting a transmittance-minimized differential signal from a graphic card through a transmission cable, the transmittance minimized differential signal including graphic data, a transmittance-minimized differential signaling receiver for decoding the transmittance minimize differential signal from the connector to generate the graphic data, a scaler for scaling the definition of the digital graphic data from the transmittance-minimized differential signaling receiver according to a liquid crystal panel, and a timing controller for driving the liquid crystal panel based on the digital graphic data from the scaler, wherein at least two of the transmittance-minimized differential signaling receiver, the scaler and the timing controller are integrated in an integrated circuit chip.

These and other aspects, features, elements and advantages of the present invention will be apparent from the following detailed description of preferred embodiments of the present invention with reference to the accompanying drawings.

DETAILED DESCRIPTION OF PREFERRED EMBODIMENTS

Preferred embodiments of the present invention will be described in detail with reference to FIG. 3 to FIG. 12 below.

Figure 1:
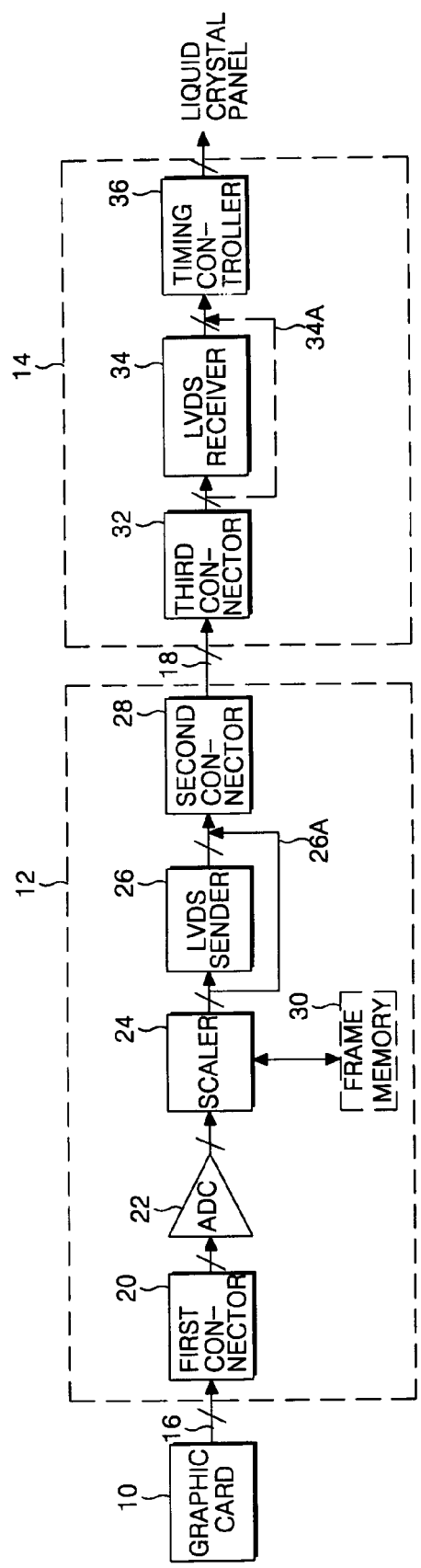
FIG. 1 is a block diagram showing the configuration of a conventional liquid crystal monitor drive apparatus of an analog system.
Figure 2:
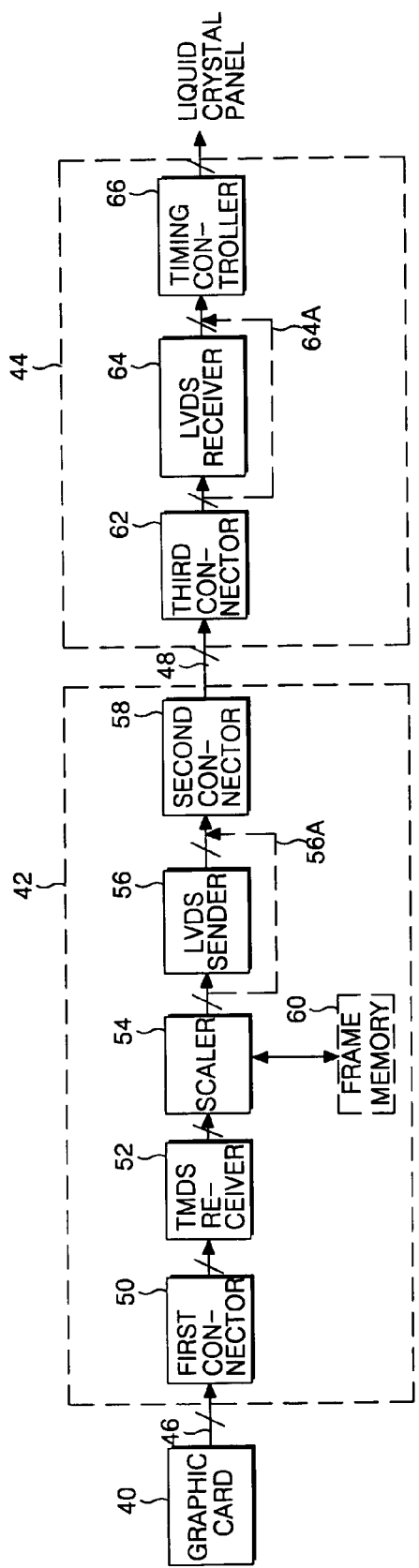
FIG. 2 is a block diagram showing the configuration of a conventional liquid crystal monitor drive apparatus of a digital system.
Figure 3:
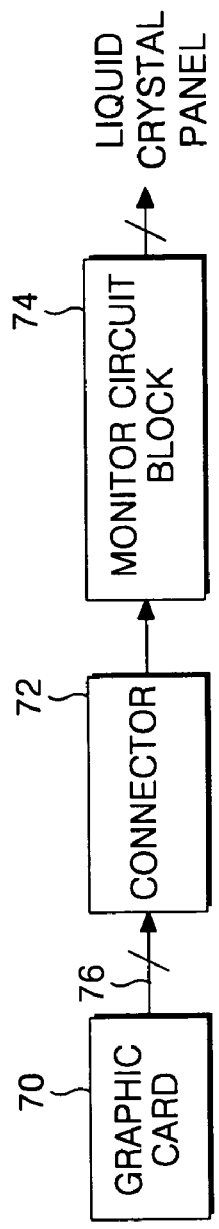
FIG. 3 is a block diagram showing the configuration of a liquid crystal monitor drive apparatus according to a first preferred embodiment of the present invention.

Referring to FIG. 3, there is shown a liquid crystal monitor drive apparatus according to a first preferred embodiment of the present invention. The liquid crystal monitor drive apparatus preferably includes a connector 72 and a monitor circuit block 74 connected between a graphic card 70 and a liquid crystal panel (not shown). The graphic card 70 is connected with the connector 72 preferably through a cable 76 or other suitable connection. The cable 76 may be any one of a serial and a parallel interface type based on the liquid crystal panel, and can be shielded to suppress the EMI caused by radio frequency signals. The graphic card 70, which is installed into a computer body, generates an analog graphic signal to be applied to the monitor circuit block 74 through the connector 72. Furthermore, the graphic card 70 supplies a clock signal and horizontal and vertical synchronous signals to monitor circuit block 74 through the connector 72. The connector 72 and the monitor circuit block 74 are preferably disposed on one printed circuit board (not shown) and the connector 72 is connected to the monitor circuit block 74 preferably via a wiring or other suitable connection. The connector 72 transmits the analog graphic signal as well as the clock signal and the horizontal and vertical synchronous signals from the cable 76 to the monitor circuit block 74, which converts the graphic signal into graphic data having a digital signal waveform shape. The monitor circuit block 74 also varies the definition and timing of the graphic data to match the definition and timing of the liquid crystal panel. In order to match the definition of the graphic data with that of the liquid crystal panel, the monitor circuit block 74 scales up or scales down the graphic data. The timing of the graphic data is adjusted on the basis of the clock signal and the horizontal and vertical synchronous signals. Furthermore, the monitor circuit block 74 drives gate and source drive ICs (Integrated Circuits) on the liquid crystal panel and a common voltage Vcom to be applied to the liquid crystal panel based on the scaled graphic data, the clock signal and the horizontal and vertical synchronous signals. Additionally, the monitor circuit block 74 applies suitable signals to an inverter.

Figure 4:
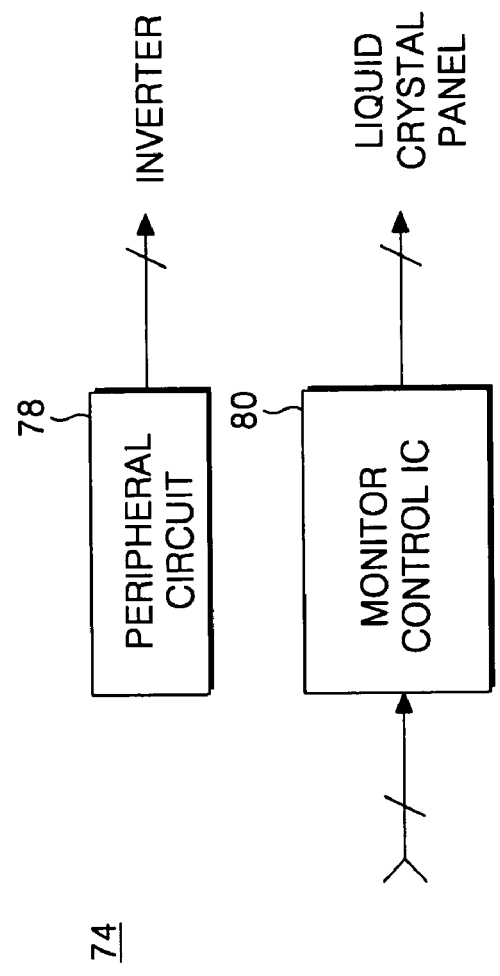
FIG. 4 is a detailed block diagram showing a first preferred embodiment of the monitor circuit block in FIG. 3.

FIG. 4 illustrates in detail a preferred embodiment of the monitor circuit block 74 shown in FIG. 3. In FIG. 4, the monitor circuit block 74 includes a peripheral circuit 78 coupled to an inverter (not shown) and a monitor control IC 80 connected between the connector 72 and the liquid crystal panel in FIG. 3. The peripheral circuit 78 operates with a frequency signal much lower than that of the clock signal, thereby not causing a serious EMI problem. Also, the peripheral circuit 78 generates a voltage and control signals required by the inverter. The monitor control IC 80 converts the graphic signal into graphic data having a digital signal waveform shape, and varies the definition and timing of the graphic data to match the definition and timing of the liquid crystal panel. In order to match the definition of the graphic data with that of the liquid crystal panel, the monitor control IC 80 scales up or scales down the graphic data. The timing of the graphic data is adjusted on the basis of the clock signal and the horizontal and vertical synchronous signals. Furthermore, the monitor control IC 80 drives gate and source drive ICs on the liquid crystal panel and a common voltage Vcom to be applied to the liquid crystal panel based on the scaled graphic data, the clock signal and the horizontal and vertical synchronous signals.

Figure 5:
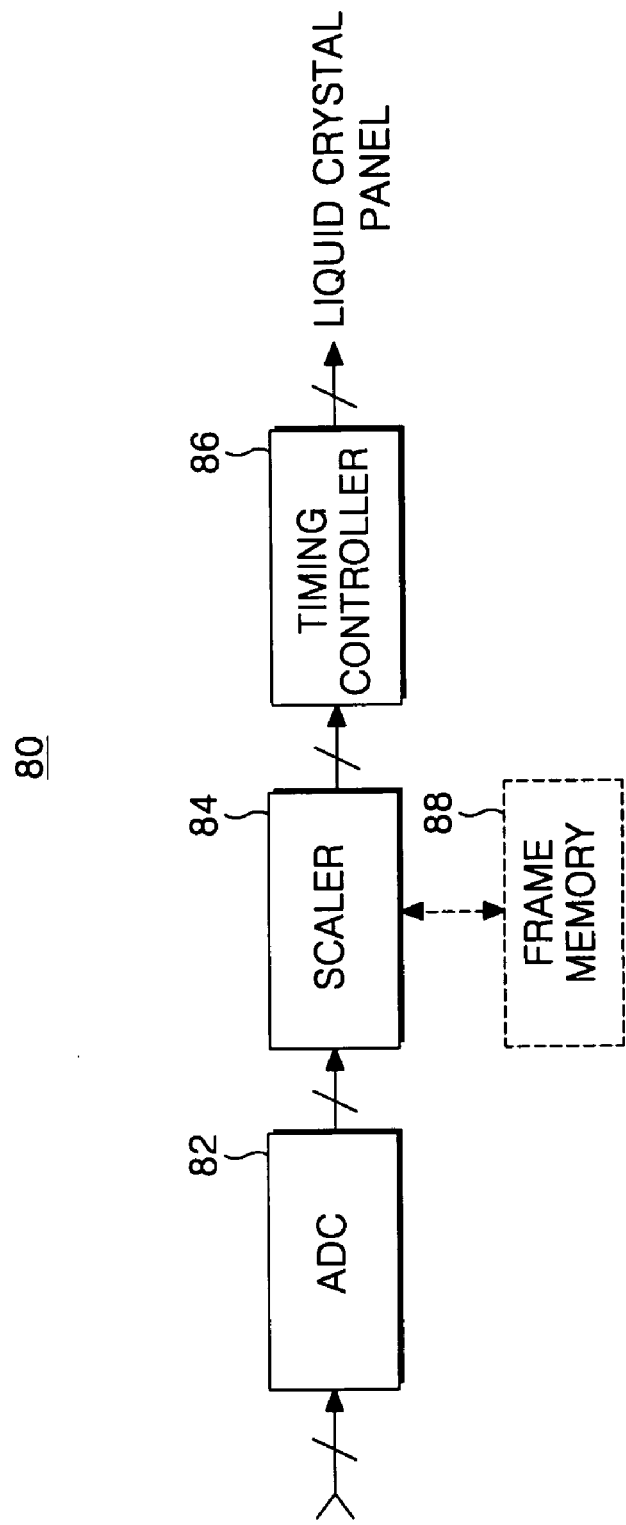
FIG. 5 is a detailed block diagram of the monitor control IC in FIG. 4.

FIG. 5 shows in detail the monitor control IC 80 in FIG. 4. In FIG. 5, the monitor control IC 80 preferably includes an ADC 82, a scaler 84 and a timing controller 86 connected between the connector 72 and the liquid crystal panel in FIG. 3. The ADC 82 converts the analog graphic signal from the connector 72 into the graphic data. The graphic data generated at the ADC 82 includes R (Red), G (Green), and B (Blue) data, and can have 24 or 48 data bits according to a type of data bus and the ADC 82 applies the graphic data to the scaler 84 through a 24-bit or 48-bit bus. The scaler 84 varies the definition and timing of the graphic data to match the definition and timing of the liquid crystal panel. For example, if the definition of the graphic data is higher than that of the liquid crystal panel, the scaler 84 scales down the graphic data and allows the picture corresponding to the scaled down digital graphic signal to be displayed on the liquid crystal panel. On the other hand, the scaler 84 scales up the digital graphic signal when the definition of the digital graphic signal is lower than that of the liquid crystal panel. Then, the picture corresponding to the scaled up graphic data is displayed on the entire or central area of the liquid crystal panel. In addition, the scaler 84 adjusts the timing of the graphic data on the basis of the clock signal as well as the horizontal and vertical synchronous signals to match with timing of the liquid crystal panel. The scaler applies the scaled graphic data, the adjusted clock signal and the adjusted horizontal and vertical synchronous signals to the timing controller 86. The timing controller 86 drives gate and source drive ICs on the liquid crystal panel and a common voltage Vcom to be applied to the liquid crystal panel based on the scaled graphic data, the adjusted clock signal, and the adjusted horizontal and vertical synchronous signals from the scaler 84. The monitor control IC 80 can further include a frame memory 88 connected with the scaler 84 in order to vary a frame rate of the graphic data.

As described above, in the liquid crystal monitor drive apparatus according to the first preferred embodiment of the present invention, the LVDS sender and receiver, the cable and connectors are preferably eliminated wherein the cable and connectors are major factors causing EMI and the ADC 82, the scaler 84 and the timing controller 86 are united in one chip so as to be included in a single IC chip. As a result, the wiring of the liquid crystal monitor drive apparatus is greatly simplified and the EMI emission within the liquid crystal monitor drive apparatus is substantially reduced. At the same time, the manufacturing cost of the liquid crystal monitor drive apparatus decreases greatly.

Figure 6:
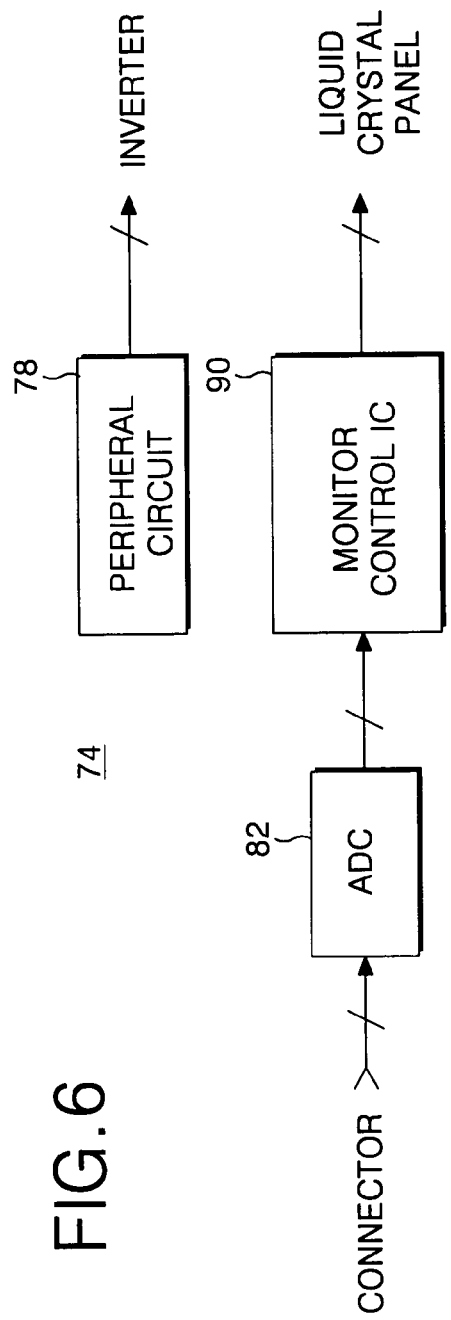
FIG. 6 is a detailed block diagram showing a second preferred embodiment of the monitor circuit block in FIG. 3.

FIG. 6 illustrates in detail another preferred embodiment of the monitor circuit block 74 shown in FIG. 3. In FIG. 6, the monitor circuit block 74 preferably includes a peripheral circuit 78 coupled to an inverter (not shown) and an ADC 82 and a monitor control IC 90 connected serially between the connector 72 and the liquid crystal panel in FIG. 3. The peripheral circuit 78 operates with a frequency signal much lower than that of the clock signal, thereby not causing a serious EMI problem, and generates a voltage and control signals required by the inverter. The ADC 82 converts the graphic signal into graphic data having the shape of a digital signal waveform, and converts the analog graphic signal from the connector 72 into the graphic data. The graphic data generated at the ADC 82 includes R (Red), G (Green), and B (Blue) data, and can have 24 or 48 data bits according to a type of data bus and the ADC 82 applies the graphic data to the monitor control IC 90 through a 24-bit or 48-bit bus. The monitor control IC 90 varies the definition and timing of the graphic data to match the definition and timing of the liquid crystal panel. In order to match the definition of the graphic data with that of the liquid crystal panel, the monitor control IC 90 scales up or down the graphic data. The timing of the graphic data is adjusted on the basis of the clock signal as well as the horizontal and vertical synchronous signals. Furthermore, the monitor control IC 90 drives gate and source drive ICs on the liquid crystal panel and a common voltage Vcom to be applied to the liquid crystal panel based on the scaled graphic data, the clock signal, and the horizontal and vertical synchronous signals.

Figure 7:
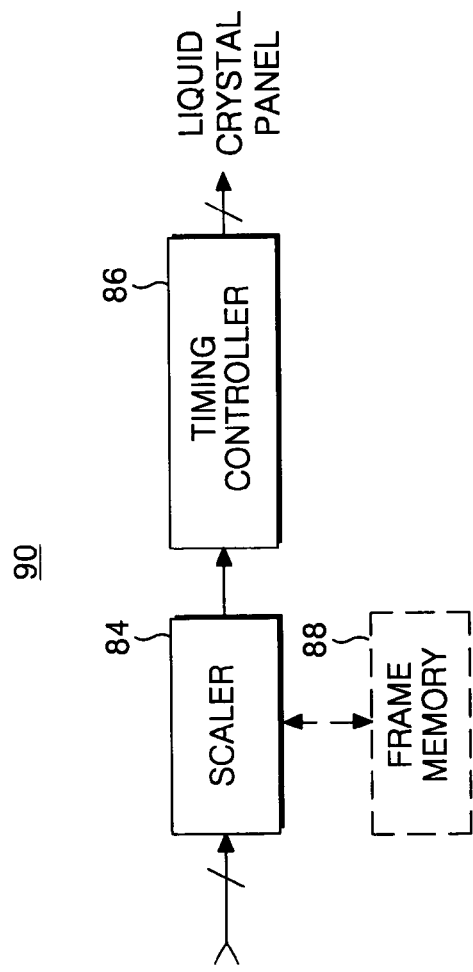
FIG. 7 is a detailed block diagram of the monitor control IC in FIG. 6.

FIG. 7 shows in detail the monitor control IC 90 in FIG. 6. In FIG. 7, the monitor control IC preferably includes a scaler 84 and a timing controller 86 connected between the ADC 82 and the liquid crystal panel in FIG. 6. The scaler 84 varies the definition and timing of the graphic data from the ADC 82 to match the definition and timing of the liquid crystal panel. For example, if the definition of the graphic data is higher than that of the liquid crystal panel, then the scaler 84 scales down the graphic data and allows the picture corresponding to the scaled down digital graphic signal to be displayed on the liquid crystal panel. On the other hand, scaler 84 scales up the digital graphic signal where the definition of the digital graphic signal is lower than that of the liquid crystal panel. The picture corresponding to the scaled up graphic data is then displayed on the entire or central area of the liquid crystal panel. Also, the scaler 84 adjusts the timing of the graphic data on the basis of the clock signal and the horizontal and vertical synchronous signals to match the timing of the liquid crystal panel. The scaler applies the scaled graphic data, the clock signal and the horizontal and vertical synchronous signals to the timing controller 86. The timing controller 86 drives gate and source drive ICs on the liquid crystal panel and a common voltage Vcom to be applied to the liquid crystal panel based on the scaled graphic data, the clock signal and the horizontal and vertical synchronous signals from the scaler 84. The monitor control IC 90 can also include a frame memory 88 connected with the scaler 84 in order to vary the frame rate of the graphic data.

As described above, in the liquid crystal monitor drive apparatus according to the first preferred embodiment of the present invention, the LVDS sender and receiver, the cable and connectors are eliminated, and the scaler 84 and the timing controller 86 are united in one chip so as to be included in a single IC chip. As a result, the wiring of the liquid crystal monitor drive apparatus is greatly simplified and the EMI emission within the liquid crystal monitor drive apparatus is substantially reduced. At the same time, the manufacturing cost of the liquid crystal monitor drive apparatus decreases greatly.

Figure 8:
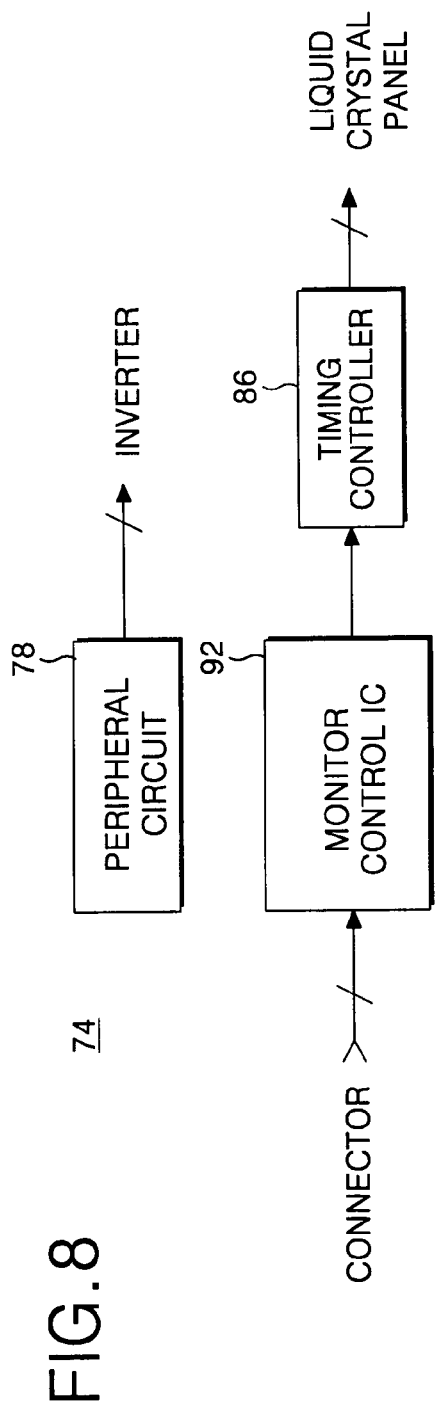
FIG. 8 is a detailed block diagram showing a third preferred embodiment of the monitor circuit block in FIG. 3.

FIG. 8 illustrates in detail still another preferred embodiment of the monitor circuit block 74 shown in FIG. 3. In FIG. 8, the monitor circuit block 74 includes a peripheral circuit 78 coupled to an inverter (not shown) and a monitor control IC 92 and a timing controller 86 connected serially between the connector 72 and the liquid crystal panel in FIG. 3. The peripheral circuit 78 operates with a frequency signal lower than that of the clock signal, thereby not causing a serious EMI problem. Also, the peripheral circuit 78 generates a voltage and control signals required by the inverter. The monitor control IC 92 converts the graphic signal into a graphic data having the shape of a digital signal waveform. The monitor control IC 92 varies the definition and timing of the graphic data to match the definition and timing of the liquid crystal panel. In order to match the definition of the graphic data with that of the liquid crystal panel, the monitor control IC 92 scales up or down the graphic data. The timing of the graphic data is adjusted on the basis of the clock signal and the horizontal and vertical synchronous signals. The monitor control IC 92 also applies the scaled graphic data, the clock signal and the horizontal and vertical synchronous signals to the timing controller 86. The timing controller 86 drives gate and source drive ICs on the liquid crystal panel and a common voltage Vcom to be applied to the liquid crystal panel based on the scaled graphic data, the clock signal and the horizontal and vertical synchronous signals received from the monitor control IC 92.

Figure 9:
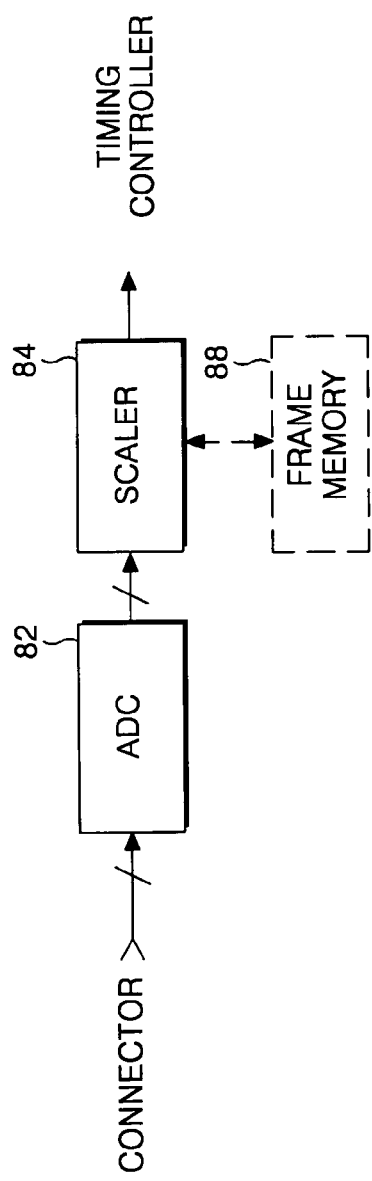
FIG. 9 is a detailed block diagram of the monitor control IC in FIG. 8.

FIG. 9 shows in detail the monitor control IC 92 in FIG. 8. In FIG. 9, the monitor control IC preferably includes an ADC 82 and a scaler 84 connected between the connector 72 and the timing controller 86 in FIG. 8. The ADC 82 converts the graphic signal into graphic data having the shape of a digital signal waveform. The ADC 82 converts the analog graphic signal from the connector 72 into the graphic data. The graphic data generated at the ADC 82 includes R (Red), G (Green), and B (Blue) data, and can have 24 or 48 data bits according to a type of data bus and the ADC 82 applies the graphic data to the scaler 84 through a 24-bit or 48-bit bus. The scaler 84 varies the definition and timing of the graphic data from the ADC 82 to match the definition and timing of the liquid crystal panel. For example, if the definition of the graphic data is higher than that of the liquid crystal panel, the scaler 84 scales down the graphic data and allows the picture corresponding to the scaled down digital graphic signal to be displayed on the liquid crystal panel. Whereas, the scaler 84 scales up the digital graphic signal when the definition of the digital graphic signal is lower than that of the liquid crystal panel. Then, the picture corresponding to the scaled up graphic data is displayed on the entire or central area of the liquid crystal panel. Also, the scaler 84 adjusts the timing of the graphic data on the basis of the clock signal as well as the horizontal and vertical synchronous signals to match the timing required by the liquid crystal panel. The scaler 84 applies the scaled graphic data, the adjusted clock signal and the adjusted horizontal and vertical synchronous signals to the timing controller 86. The monitor control IC 92 can also include a frame memory 88 connected with the scaler 84 in order to vary the frame rate of the graphic data.

As described above, in the liquid crystal monitor drive apparatus according to the first preferred embodiment of the present invention, the LVDS sender and receiver, the cable and connectors are eliminated and the ADC 82 and the scaler 84 are united in one chip so as to define a single unitary IC chip. As a result, the wiring of the liquid crystal monitor drive apparatus is greatly reduced and the liquid crystal monitor drive apparatus is substantially less affected by the EMI emissions. At the same time, the manufacturing cost of the liquid crystal monitor drive apparatus is greatly reduced.

Figure 10:
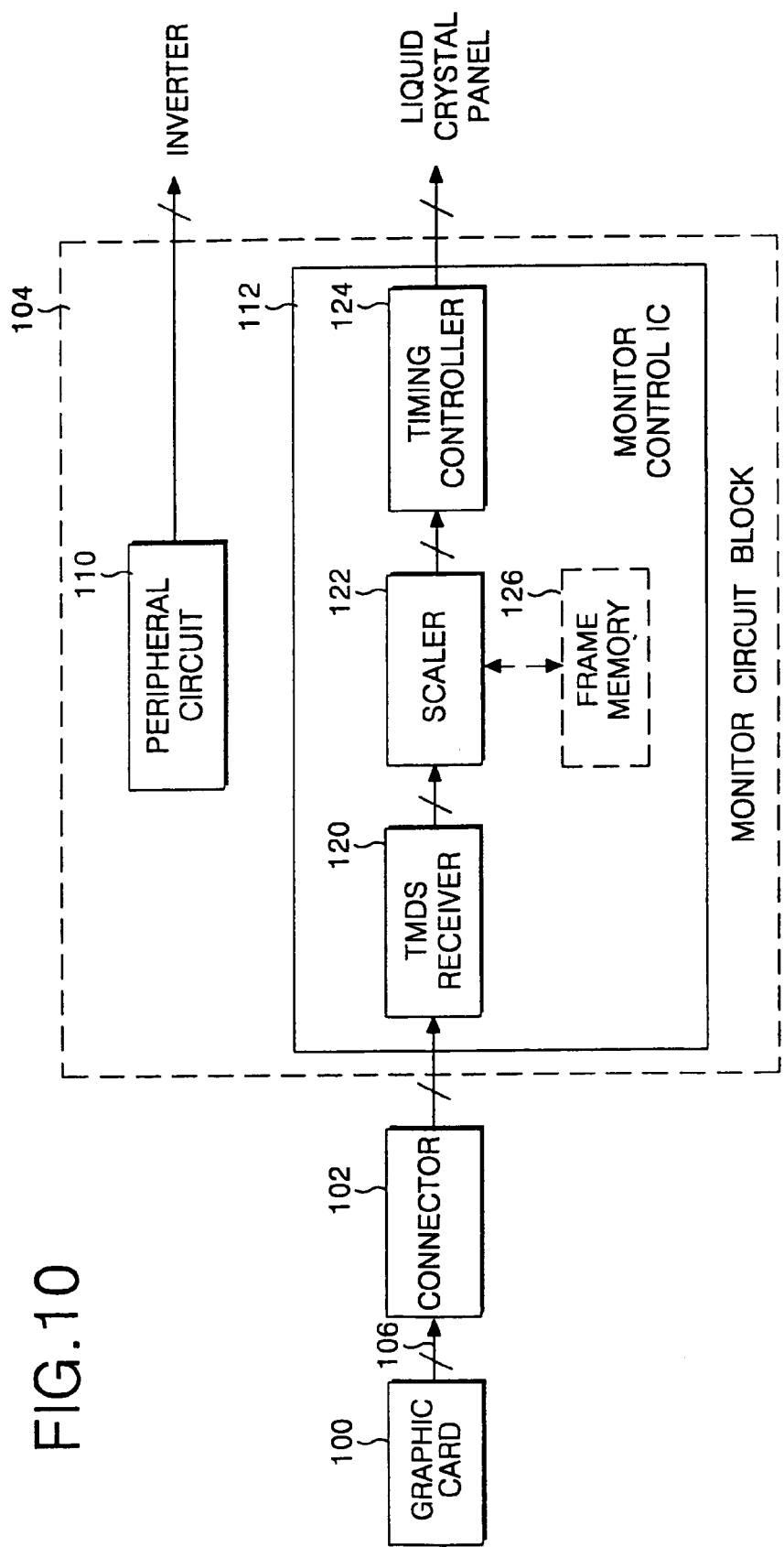
FIG. 10 is a block diagram showing the configuration of a liquid crystal monitor drive apparatus according to a second preferred embodiment of the present invention.

Referring to FIG. 10, there is shown a liquid crystal monitor drive apparatus according to a second preferred embodiment of the present invention. The liquid crystal monitor drive apparatus preferably includes a connector 102 and a monitor circuit block 104 connected between a graphic card 100 and a liquid crystal panel (not shown). The graphic card 100 is connected with the connector 102 via a cable 106 or other suitable connection. Cable 106 may be any one of a serial or parallel interface type, based on the requirement of the liquid crystal panel. The cable 106 can be shielded to suppress the EMI caused by radio frequency signals. Furthermore, cable 106 is preferably varied in accordance with digital interface standards (e.g., P&G, DFP, DVI and so on). The graphic card 100 is installed into a computer body, and generates graphic data having the shape of a parallel data waveform while encoding the parallel graphic data having R, G, and B data into a transmittance-minimized differential signal. To this end, the graphic card 100 includes a TMDS (Transmittance-Minimized Differential Signaling) sender. The transmittance-minimized differential signal is applied to the connector 102 through the cable 106. In addition, the graphic card 100 supplies a clock signal as well as horizontal and vertical synchronous signals to the signal converting stage 102 through the cable 106.

The connector 102 and the monitor circuit block 104 are preferably disposed on one printed circuit board (not shown) and the connector 102 is connected to the monitor circuit block 104 preferably via a wiring. The connector 102 transmits the transmittance-minimized differential signal from the cable 106 to the monitor circuit block 104 as well as the clock signal and the horizontal and vertical synchronous signals. The connector 102 can be differed according to graphic data transmission standards.

The monitor circuit block 104 preferably includes a peripheral circuit 110 coupled to an inverter (not shown) and a monitor control IC 112 connected between the connector 102 and the liquid crystal panel. The peripheral circuit 110 operates with a frequency signal much lower than that of the clock signal, thereby not causing a serious EMI problem.

Also, the peripheral circuit 110 generates a voltage and control signals required by the inverter. The monitor control IC 112 preferably includes a TMDS receiver 120, a scaler 122 and a timing controller 124 connected serially between the connector 102 and the liquid crystal panel. The TMDS receiver 120 inputs the transmittance-minimized differential signal, the clock signal, and the horizontal and vertical synchronous signals from the cable 106 through the connector 102. The TMDS receiver 120 decodes the transmittance-minimized differential signal, and obtains the parallel graphic data. The parallel graphic data generated at the TMDS receiver 120 is applied to the scaler 122, and can have 24 or 48 data bits according to a type of data bus and the TMDS receiver 120 applies the graphic data to the scaler 122 through a 24-bit or 48-bit bus. The scaler 122 varies the definition and timing of the graphic data to match the definition and timing of the liquid crystal panel. For example, if the definition of the graphic data is higher than that of the liquid crystal panel, the scaler 122 scales down the graphic data and allows the picture corresponding to the scaled down digital graphic signal to be displayed on the liquid crystal panel. On the other hand, the scaler 122 scales up the digital graphic signal when the definition of the digital graphic signal is lower than that of the liquid crystal panel. Then, the picture corresponding to the scaled up graphic data is displayed on the entire or central area of the liquid crystal panel. Also, the scaler 122 adjusts the timing of the graphic data on the basis of the clock signal as well as the horizontal and vertical synchronous signals to identify with the timing required by the liquid crystal panel. The scaler 122 applies the scaled graphic data, the adjusted clock signal, and the adjusted horizontal and vertical synchronous signals to the timing controller 124. The timing controller 124 drives gate and source drive ICs on the liquid crystal panel and a common voltage Vcom to be applied to the liquid crystal panel based on the scaled graphic data, the adjusted clock signal, and the adjusted horizontal and vertical synchronous signals from the scaler 122. The monitor control IC 112 can also include a frame memory 126 connected with the scaler 122 in order to vary the frame rate of the graphic data.

In the liquid crystal monitor drive apparatus according to the second preferred embodiment of the present invention, the LVDS sender and receiver, the cable and connectors are removed and the TMDS 120, the scaler 122, and the timing controller 124 are united in one chip so as to define a single integrated chip. As a result, the wiring of the liquid crystal monitor drive apparatus is greatly simplified and the effect of EMI emission within liquid crystal monitor drive apparatus is substantially reduced. At the same time, the manufacturing cost of the liquid crystal monitor drive apparatus is decreased greatly.

Figure 11:
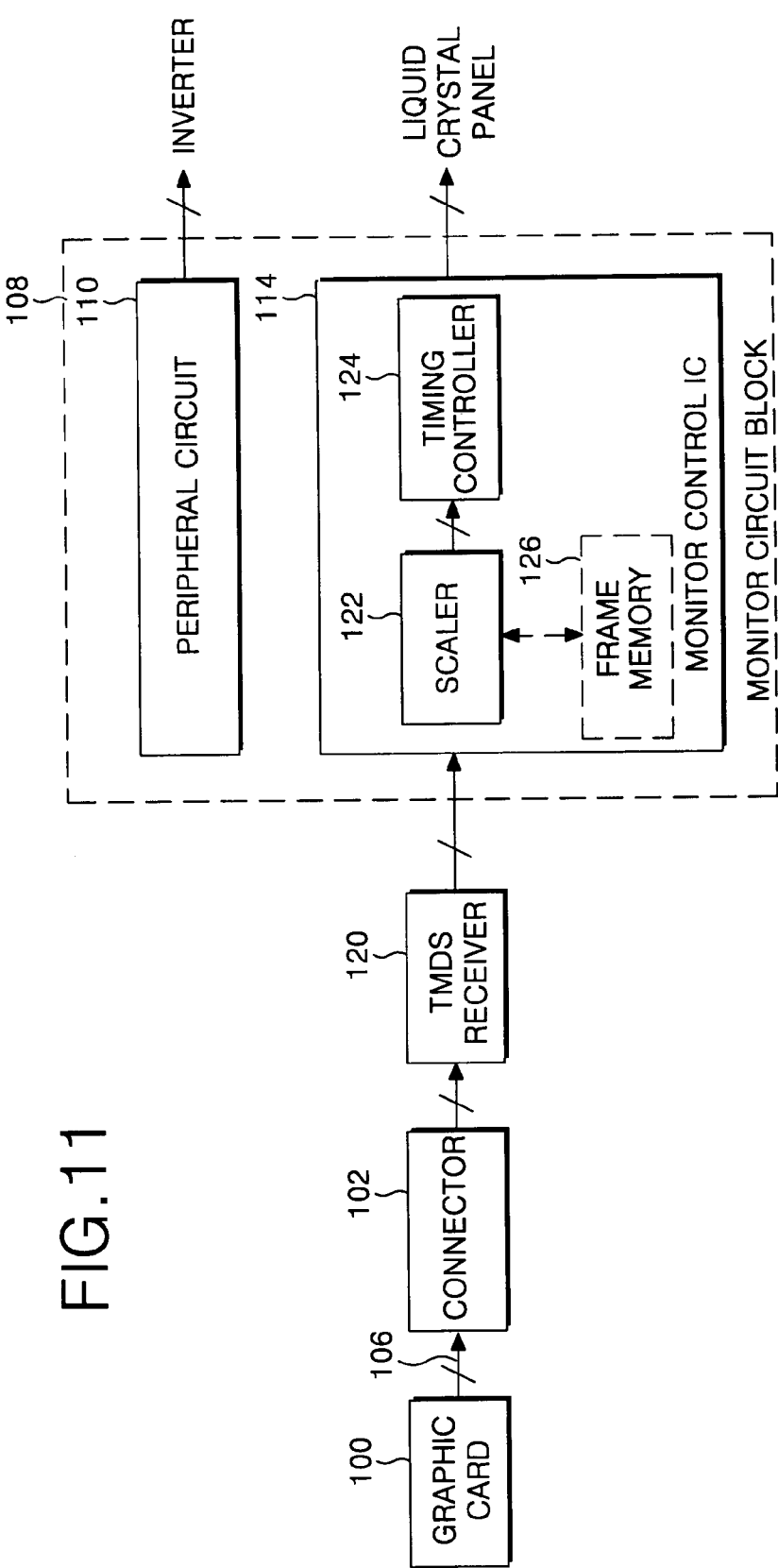
FIG. 11 is a block diagram showing the configuration of a liquid crystal monitor drive apparatus according to a third preferred embodiment of the present invention.

FIG. 11 illustrates a liquid crystal monitor drive apparatus according to a third preferred embodiment of the present invention. The liquid crystal monitor drive apparatus includes a connector 102, a TMDS receiver 120 and a monitor circuit block 108 connected between a graphic card 100 and a liquid crystal panel in serial. The graphic card 100 is connected with the connector 102 preferably via a cable 106 or other suitable connector. The graphic card 100 is installed into a computer body. The graphic card 100 generates a graphic data having the shape of a parallel data waveform and encodes the parallel graphic data including R, G, and B data into a transmittance-minimized differential signal. To this end, the graphic card 100 includes a TMDS (Transmittance-Minimized Differential Signaling) sender. The transmittance-minimized differential signal is applied to the connector 102 through to cable 106. Furthermore, the graphic card 100 supplies a clock signal and a horizontal and vertical synchronous signals to the signal converting stage 102 through the cable 106.

The connector 102 and the TMDS receiver 120 and the monitor circuit block 108 are preferably disposed on one printed circuit board (not shown) and the connector 102 is connected to the TMDS receiver 120 preferably via a wiring or other suitable connection. The connector 102 transmits the transmittance-minimized differential signal from the cable 106 to the TMDS receiver 120 as well as the clock signal and the horizontal and vertical synchronous signals.

The TMDS receiver 120 inputs the transmittance-minimized differential signal, the clock signal, and the horizontal and vertical synchronous signals from the cable 106 through the connector 102. The TMDS receiver 120 decodes the transmittance-minimized differential signal and obtains the parallel graphic data. The parallel graphic data generated at the TMDS receiver 120 is then applied to the monitor circuit block 108. The graphic data decoded by the TMDS receiver 120 can have 24 or 48 data bits according to a type of data bus and the TMDS receiver 120 applies the graphic data to the monitor circuit block 108 through a 24-bit or 48-bit bus.

The monitor circuit block 108 includes a peripheral circuit 110 coupled to an inverter (not shown) and a monitor control IC 114 connected between the TMDS receiver 120 and the liquid crystal panel. The peripheral circuit 110 operates with a frequency signal much lower than that of the clock signal, thereby not causing a serious EMI problem. The peripheral circuit 110 also generates a voltage and control signals required by the inverter. The monitor control IC 114 includes a scaler 122 and a timing controller 124 connected serially between the TMDS receiver 120 and the liquid crystal panel. The scaler 122 varies the definition and timing of the graphic data to match the definition and timing of the liquid crystal panel. For example, if the definition of the graphic data is higher than that of the liquid crystal panel, the scaler 122 scales down the graphic data and allows the picture corresponding to the scaled down digital graphic signal to be displayed on the liquid crystal panel. On the other hand, the scaler 122 scales up the digital graphic signal when the definition of the digital graphic signal is lower than that of the liquid crystal panel. The picture corresponding to the scaled up graphic data is then displayed on the entire or central area of the liquid crystal panel. Also, the scaler 122 adjusts the timing of the graphic data on the basis of the clock signal and the horizontal and vertical synchronous signals to match the timing required by the liquid crystal panel. The scaler 122 applies the scaled graphic data, the adjusted clock signal, and the adjusted horizontal and vertical synchronous signals to the timing controller 124. The timing controller 124 drives gate and source drive ICs on the liquid crystal panel and a common voltage Vcom to be applied to the liquid crystal panel based on the scaled graphic data, the adjusted clock signal, and the adjusted horizontal and vertical synchronous signals from the scaler 122. The monitor control IC 114 can also include a frame memory 126 connected with the scaler 122 in order to vary the frame rate of the graphic data.

In the liquid crystal monitor drive apparatus according to the third preferred embodiment of the present invention, the LVDS sender and receiver, the cable and connectors are eliminated and the scaler 122 and the timing controller 124 are united in one chip so as to define a single integrated IC chip. As a result, the wiring of the liquid crystal monitor drive apparatus is significantly simplified, and the liquid crystal monitor drive apparatus is much less vulnerable to the EMI emissions. At the same time, the manufacturing cost of the liquid crystal monitor drive apparatus is reduced greatly.

Figure 12:
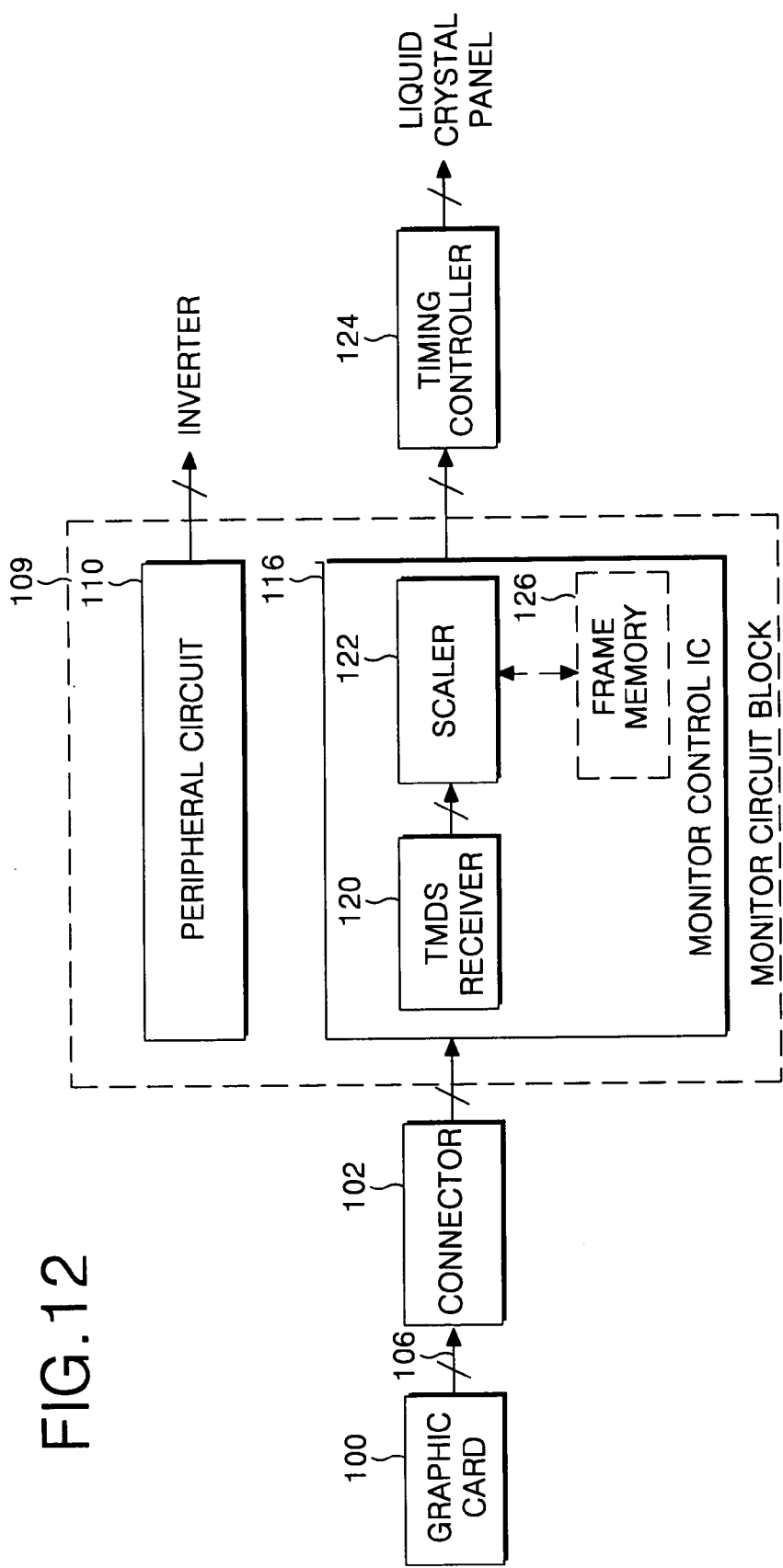
FIG. 12 is a block diagram showing the configuration of a liquid crystal monitor drive apparatus according to a fourth preferred embodiment of the present invention.

Referring to FIG. 12, there is shown a liquid crystal monitor drive apparatus according to a fourth preferred embodiment of the present invention. The liquid crystal monitor drive preferred apparatus includes a connector 102, a monitor circuit block 109 and a timing controller 124 connected serially between a graphic card 100 and a liquid crystal panel. The graphic card 100 is connected with the connector 102 preferably via a cable 106 or other suitable connection. The graphic card 100 is installed into a computer body, and generates a graphic data having a shape of parallel data waveform and encodes the parallel graphic data including R, G, and B data into a transmittance-minimized differential signal. To this end, the graphic card 100 includes a TMDS (Transmittance-Minimized Differential Signaling) sender. The transmittance-minimized differential signal is applied to the connector 102 through cable 106. Furthermore, the graphic card 100 supplies a clock signal as well as horizontal and vertical synchronous signals to the signal converting stage 102 through the cable 106.

The connector 102, the monitor circuit block 109, and the timing controller 124 are preferably provided on one printed circuit board (not shown), and the connector 102 is connected to the monitor circuit block 109 preferably via a wiring or other suitable connection. The connector 102 transmits the transmittance-minimized differential signal, the clock signal, and the horizontal and vertical synchronous signals from the cable 106 to the monitor circuit block 109.

The monitor circuit block 109 includes a peripheral circuit 110 coupled to an inverter (not shown) and a monitor control IC 116 connected between the connector 102 and the timing controller 124. The peripheral circuit 110 operates with a frequency signal much lower than that of the clock signal, thereby not causing a serious EMI problem, and generates voltage and control signals required by the inverter. The monitor control IC 116 includes a TMDS receiver 120 and a scaler 122 connected serially between the connector 102 and the timing controller 124. The TMDS receiver 120 inputs the transmittance-minimized differential signal, the clock signal, and the horizontal and vertical synchronous signals from the cable 106 through the connector 102. The TMDS receiver 120 decodes the transmittance-minimized differential signal and obtains the parallel graphic data. The parallel graphic data generated at the TMDS receiver 120 is applied to the scaler 122, and can have 24 or 48 data bits according to a type of data bus and the TMDS receiver 120 applies the graphic data to the scaler 122 through a 24-bit or 48-bit bus. The scaler 122 varies the definition and timing of the graphic data to match the definition and timing of the liquid crystal panel. For example, if the definition of the graphic data is higher than that of the liquid crystal panel, the scaler 122 scales down the graphic data and allows the picture corresponding to the scaled down digital graphic signal to be displayed on the liquid crystal panel. On the other hand, the scaler 122 scales up the digital graphic signal when the definition of the digital graphic signal is lower than that of the liquid crystal panel. Then, the picture corresponding to the scaled up graphic data is displayed on the entire or central area of the liquid crystal panel. Also, the scaler 122 adjusts the timing of the graphic data on the basis of the clock signal and the horizontal and vertical synchronous signals to match the timing required by the liquid crystal panel. The scaler 122 applies the scaled graphic data, the adjusted clock signal, and the adjusted horizontal and vertical synchronous signals to the timing controller 124. The monitor control IC 116 can also include a frame memory 126 connected with the scaler 122 in order to vary the frame rate of the graphic data. The timing controller 124 drives gate and source drive ICs on the liquid crystal panel and a common voltage Vcom to be applied to the liquid crystal panel based on the scaled graphic data, the adjusted clock signal, and the adjusted horizontal and vertical synchronous signals from the scaler 122 of the monitor control IC 116.

Figure 13:
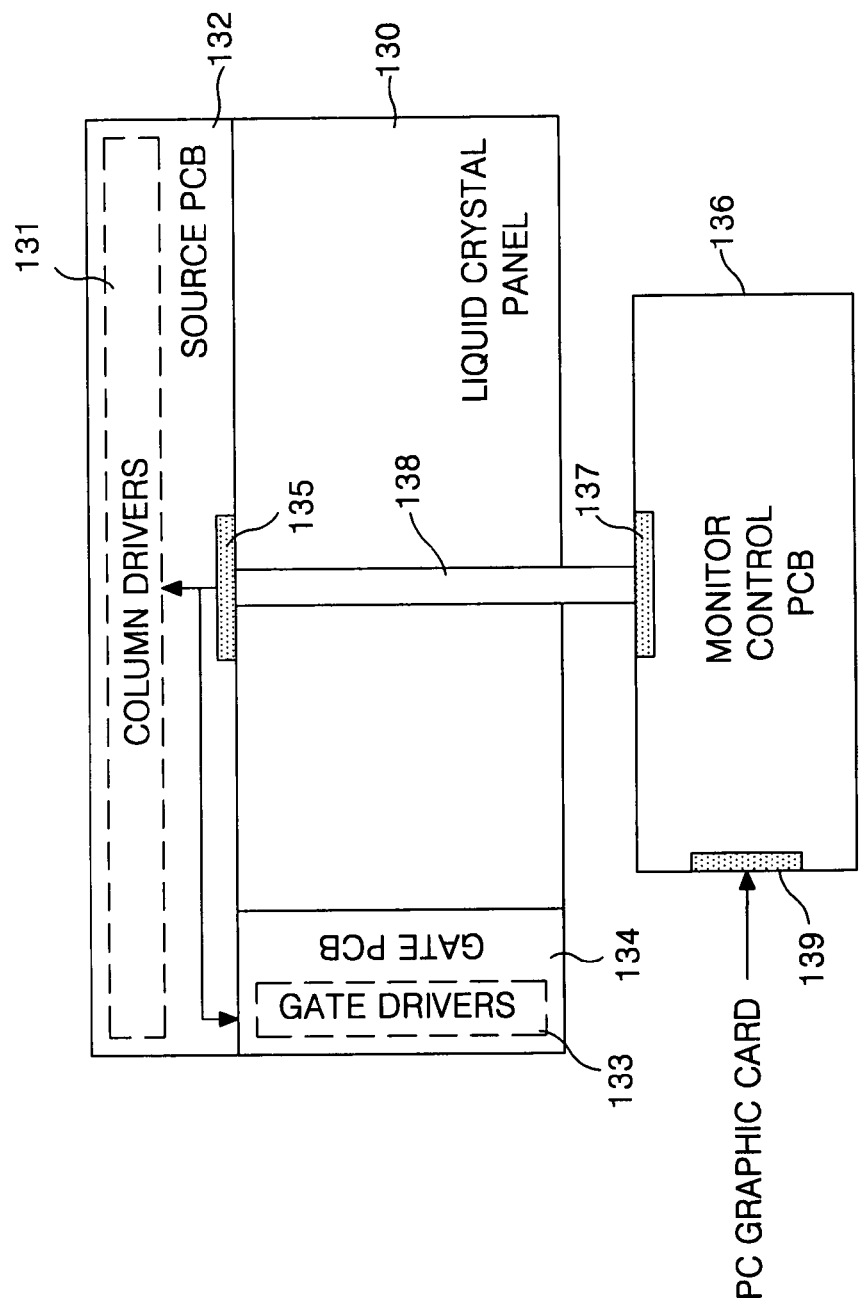
FIG. 13 is a block diagram showing the configuration of a liquid crystal monitor according to a preferred embodiment of the present invention.

FIG. 13 illustrates a liquid crystal monitor according to a preferred embodiment of the present invention. In FIG. 13, the liquid crystal monitor includes a liquid crystal panel 130 loading a source PCB 132 and a gate PCB 134. The source PCB 132 responds to the signals from a first connector 135 and drives column driver IC chips 131 on the top edge of the back face of the liquid crystal panel 130. The gate PCB 134 also drives gate driver IC chips on the right edge of the back face of the liquid crystal panel 130, on the basis of the signals from the first connector 135 via the source PCB 132.

The liquid crystal monitor further includes a monitor control PCB 136 having a second and third connectors 137 and 139, and a cable 138 connected between the first and second connectors 135 and 137. The cable 138 transmits data, control signals and driving voltages from the second connector 137 connected to the monitor control PCB 136 to the first connector 135. Thus, the first connector 135 applies the data, control signals and driving voltages to the source PCB 132. Also, the first connector 135 supplies the control signals and driving voltages to the gate PCB 134 through the source PCB 132. The third connector 139 connects the monitor control PCB 136 to a graphic card of a personal computer body (not shown). Also, the third connector 139 applies a video signal and synchronous signals from the graphic card to the monitor control PCB 136.

The monitor control PCB 136 forms the data and control signals from the video signal and synchronous signals and generates the driving voltages. In order to form the data and control signals, the monitor control PCB 136 includes an analog-digital converter or a TMDS receiver in accordance with the format of the video signal as well as a scaler and a timing controller. If the video signal is in an analog format, the monitor control PCB has the analog-digital converter. Meanwhile, the monitor control PCB 136 includes the TMDS receiver instead of the analog-digital converter in the case that the video signal is in the digital format. Also, the moinitor control PCB 136 further includes a voltage source or a power supply for generating the driving voltages.

The liquid crystal monitor shown in FIG. 13 allows the monitor control circuit to be arranged on the individual circuit board separated from the source and gate circuit boards, thereby reducing elements on the source and gate circuit boards. Therefore, the source and gate circuit boards are small in size and furthermore the productivity and work efficiency are enhanced. As a result, the yield of the liquid crystal monitor increases greatly. Also, the mechanism design of the liquid crystal monitor becomes facile.

As described above, in the liquid crystal monitor drive apparatus according to the fourth preferred embodiment of the present invention, the LVDS sender and receiver, the cable, and connectors are eliminated and the TMDS receiver 120 and the scaler 122 are united in one chip so as to define a single integrated IC chip. As a result, the internal wiring of the liquid crystal monitor drive apparatus and EMI emissions within the liquid crystal monitor drive apparatus are substantially reduced. At the same time, the manufacturing cost of the liquid crystal monitor drive apparatus is greatly decreased.

Although the present invention has been explained by reference to the preferred embodiments shown in the drawings and as described above, it should be understood to the ordinary skilled person in the art that the present invention is not limited to the above-described embodiments, but rather that various changes or modifications thereof are possible without departing from the spirit of the invention. Accordingly, the scope of the invention shall be determined only by the appended claims and their equivalents.

What is claimed is:

1. A liquid crystal monitor drive apparatus for driving a liquid crystal panel, comprising:
    an integrated circuit chip, the integrated circuit chip receiving an analog graphic signal, a clock signal corresponding to the analog graphic signal, and horizontal and vertical synchronous signals, the integrated circuit chip including
    an analog-digital converter arranged to convert the analog graphic signal into digital graphic data;
    a scaler for scaling the definition and timing of the digital graphic data by adjusting the timing of the graphic data based on the clock signal and adjusting the horizontal and vertical synchronous signals to match with a timing of the liquid crystal panel; and
    a timing controller arranged to drive the liquid crystal panel based on the scaled digital graphic data, the adjusted clock signal, and the adjusted horizontal and vertical synchronous signals from the scaler; and
    a peripheral circuit coupled to an inverter for driving a back light unit, the peripheral circuit operating with a frequency significantly lower than a frequency of the clock signal corresponding to the analog graphic signal.

2. The liquid crystal monitor drive apparatus as claimed in claim 1, wherein the integrated circuit chip further includes a frame memory connected with the scaler.

3. The liquid crystal monitor drive apparatus as claimed in claim 1, wherein the integrated circuit chip further includes a frame memory connected with the scaler.

4. The liquid crystal monitor drive apparatus as claimed in claim 1, wherein there is no wiring between the analog-digital converter and the scaler or the scaler and the timing controller.

* * * * *